United States Patent
Herten et al.

(10) Patent No.: US 10,960,738 B2
(45) Date of Patent: Mar. 30, 2021

(54) ARRANGEMENT WITH A CRASH PROFILE AND A LOAD TRANSMISSION ELEMENT ON A MOTOR VEHICLE, LOAD TRANSMISSION ELEMENT AND MOTOR VEHICLE OR VEHICLE DOOR

(71) Applicant: VOLKSWAGEN AKTIENGESELLSCHAFT, Wolfsburg (DE)

(72) Inventors: Helge Herten, Braunschweig (DE); Volker Hohm, Destedt (DE); Tobias Stroehlein, Braunschweig (DE); Krino Bornemann, Klein Ammensleben (DE); Philipp Hoermann, Ratingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 116 days.

(21) Appl. No.: 16/121,005

(22) Filed: Sep. 4, 2018

(65) Prior Publication Data

US 2018/0370342 A1 Dec. 27, 2018

Related U.S. Application Data

(63) Continuation of application No. PCT/EP2017/051917, filed on Jan. 30, 2017.

(30) Foreign Application Priority Data

Mar. 1, 2016 (DE) ...................... 10 2016 203 339.5
Sep. 19, 2016 (DE) ...................... 10 2016 217 847.4

(51) Int. Cl.
*B60J 5/04* (2006.01)

(52) U.S. Cl.
CPC ............ *B60J 5/0458* (2013.01); *B60J 5/0426* (2013.01); *B60J 5/0437* (2013.01); *B60J 5/0438* (2013.01); *B60J 5/0444* (2013.01); *B60J 5/0462* (2013.01)

(58) Field of Classification Search
CPC ........ B60J 5/042; B60J 5/0522; B60J 5/0426; B60J 5/0438; B60J 5/0441; B60J 5/0456;
(Continued)

(56) References Cited

U.S. PATENT DOCUMENTS 4,293,160 A 10/1981 Lütze et al.
4,434,580 A * 3/1984 Engelsberger ......... B60J 5/0412
296/146.6

(Continued)

FOREIGN PATENT DOCUMENTS

CN 1257452 A 6/2000
DE 1775038 A1 6/1971
(Continued)

OTHER PUBLICATIONS

International Search Report dated May 8, 2017 in corresponding application PCT/EP2017/051917.
(Continued)

*Primary Examiner* — Dennis H Pedder
(74) *Attorney, Agent, or Firm* — Muncy, Geissler, Olds & Lowe, P.C.

(57) ABSTRACT

An arrangement for the transfer of collision forces possibly resulting from a crash event from one body part to another body part of a motor vehicle, with a hollow profile acting as a crash profile, which hollow profile runs in the main direction of travel or transversely to the main direction of travel is loaded on pressure in the case of the crash event, and is frontally supported on each of the body parts. The hollow profile is frontally supported on the respective body
(Continued)

part by means of interposition of in each case a load transfer element.

13 Claims, 8 Drawing Sheets

(58) Field of Classification Search
CPC ...... B60J 5/0458; B60J 5/0461; B60J 5/0462; B60J 5/0444
USPC .............................. 296/146.6, 187.09, 187.1
See application file for complete search history.

(56) References Cited

U.S. PATENT DOCUMENTS

| | | |
|---|---|---|
| 5,000,509 A | 3/1991 | Sinnhuber et al. |
| 5,895,088 A | 4/1999 | Knott |
| 5,908,216 A | 6/1999 | Townsend |
| 7,735,901 B2 | 6/2010 | Melz et al. |
| 9,254,732 B2 | 2/2016 | Dettling et al. |
| 2016/0136870 A1 | 5/2016 | Thienel et al. |
| 2017/0080985 A1 | 3/2017 | Wilhelm et al. |

FOREIGN PATENT DOCUMENTS

| | | |
|---|---|---|
| DE | 2836213 A1 | 2/1980 |
| DE | 3621697 A1 | 1/1988 |
| DE | 3928869 A1 | 3/1990 |
| DE | 9302344 U1 | 7/1993 |
| DE | 4240416 A1 | 9/1993 |
| DE | 4240416 B4 | 9/1993 |
| DE | 4422745 A1 | 1/1996 |
| DE | 19627061 A1 | 11/1996 |
| DE | 19828444 A1 | 12/1999 |
| DE | 19904630 A1 | 8/2000 |
| DE | 19942644 A1 | 3/2001 |
| DE | 10248846 A1 | 4/2004 |
| DE | 10341329 A1 | 4/2005 |
| DE | 10357311 A1 | 7/2005 |
| DE | 102005011162 A1 | 9/2006 |
| DE | 102006004171 A1 | 8/2007 |
| DE | 602004002822 T2 | 8/2007 |
| DE | 102006046815 A1 | 4/2008 |
| DE | 102011117798 A1 | 5/2013 |
| DE | 102013002365 B3 | 1/2014 |
| DE | 102012217663 A1 | 5/2014 |
| DE | 102013004950 A1 | 9/2014 |
| DE | 102014007750 A1 | 11/2015 |
| DE | 102014214846 A1 | 2/2016 |
| DE | 102014218774 A1 | 3/2016 |
| DE | 102015208779 | * 11/2016 ............ B60J 5/0443 |
| DE | 102015208779 A1 | 11/2016 |
| EP | 1775172 A2 | 4/2007 |
| EP | 3047953 A1 | 7/2016 |
| FR | 2888554 A1 | 1/2007 |
| FR | 2917336 A1 | 12/2008 |
| JP | 2015016738 A | 1/2015 |
| WO | WO2010012916 A1 | 2/2010 |
| WO | WO2012156008 A1 | 11/2012 |
| WO | WO2015014620 A2 | 2/2015 |

OTHER PUBLICATIONS

Chinese Office Action dated Oct. 10, 2020 in corresponding application 201780010055.2

* cited by examiner

ARRANGEMENT WITH A CRASH PROFILE AND A LOAD TRANSMISSION ELEMENT ON A MOTOR VEHICLE, LOAD TRANSMISSION ELEMENT AND MOTOR VEHICLE OR VEHICLE DOOR

This nonprovisional application is a continuation of International Application No. PCT/EP2017/051917, which was filed on Jan. 30, 2017, and which claims priority to German Patent Application No. 10 2016 203 339.5, which was filed in Germany on Mar. 1, 2016, German Patent Application No 10 2016 215 114.2, which was filed in Germany on Aug. 12, 2016 and German Patent Application No. 10 2016 217 847.4, which was filed in Germany on Sep. 19, 2016 which all herein incorporated by reference.

BACKGROUND OF THE INVENTION

Field of the Invention

The present invention relates to a car body side structure for transferring collision forces resulting from a possible crash event from one pillar to another pillar of a motor vehicle.

Description of the Background Art

The greatly increased introduction of force with small overlap on, in particular, the front doors of a motor vehicle in a frontal crash can lead to deformation of the doors towards the interior of the motor vehicle, thus seriously endangering an occupant. To counter this disadvantageous circumstance, it is known to transfer the collision forces via the A-pillar of the motor vehicle body, and further via an additionally provided highly rigid, in particular tubular geometry, also referred to as crash tube, to the B-pillar of the vehicle body. Conventional constructions cause a kinking of this tube at too high a load so that no further forces can be transferred. For this reason, crash tubes are getting stiffer, that is, also heavier, to meet a critical level of force. Current solutions in this respect apply to crash tubes made of high-strength or ultra-high-strength steels, which are attached to the inner door parts of vehicle doors, in particular on the inner door panel, by means of spot welding and which in the event of a crash are supported on counter plates of the A and B pillars. In addition to roof rails and rocker panels, this creates a third load path by means of which the impact energy resulting from a frontal crash is transferred to the rear of the vehicle. However, in order to counteract the weight increase, it is known to form the metal crash tubes with thinner walls, but also to arrange a so-called molded body therein to ensure the required buckling strength. According to DE 10 2014 218 774 A1, the molded body can have a plastic, a fiber composite material or a metal, and be formed as a hollow body. In practice it was found that for the embodiment of the third load path, secure contact of the crash tube on the counter plates of the A and B pillars is essential if there is crash-related deformation of the plates. This is where the invention described below begins.

From DE 10 2014 207 060 A1, a generic body side structure is known in which a side rail (i.e., door rail tube) arranged in the door interior of a vehicle side door is realized as a hollow profile part. The rear side rail end, as viewed in the vehicle longitudinal direction, is laterally supported in the event of a crash so that the rear side rail end does not buckle prematurely in the event of a crash. The side rail has an impact contour at its side that faces away from the crash, which in the event of a frontal crash is pressed directly or indirectly in load transferring connection with an impact contour of the vehicle pillar facing away from the crash.

SUMMARY OF THE INVENTION

It is therefore an object of the present invention to provide an alternative body side structure for the transfer of collision forces resulting from a possible crash event from one body part to another body part of the motor vehicle and to provide a load transfer element which is easy to manufacture and inexpensive, and which in the event of deformation of at least one of the body parts safely and effectively maintains the load path by means of a secure connection of a crash profile to assigned body parts.

The invention is based on the finding that, in particular in thin-walled crash profiles such as the thin-walled crash tubes described above, there is a danger that to form the third load path, in the event of a crash and especially with crash-induced deformation of the associated body parts, the crash tubes do not always contact sufficiently to ensure safe force transmission and prevent kinking of the crash profile at too high a load.

Therefore, based on a body side structure with a hollow profile arranged in a door interior for transferring collision forces resulting from a crash event from a front pillar (A-pillar) to a rear pillar (B-pillar) of a motor vehicle, wherein the hollow profile runs in the main direction of travel, is loaded on pressure in the case of the crash event and is supported on the front side on the relevant body part by means of interposition of in each case a load transfer element, the object is achieved according to the characterizing part of claim 1, in that the load transfer element has a base body and a pin-like mounting section which adjoins the former on the hollow profile side, wherein the pin-like mounting section is inserted into the hollow profile at its end.

By means of the load transfer element, advantageously an adapter element is created, so to speak, which is adapted or customizable according to the adjacent structures, namely the crash profile and the respective body part, and so in the event of a crash, guarantees a functionally reliable load path from one body pillar to the other via the crash profile. Therefore, a single crash profile is available which can be used for a variety of motor vehicles, which can be adapted or is adaptable by means of the load transfer elements to individual structures of the vehicle pillars or to body parts, resulting in particular in cost advantages in the production of the crash profile and the material, and in weight advantages.

In the event of a crash, for example, at least one fixing and/or centering element is formed on or in the region of the free end face of the base body to securely fix and/or center the respective load transfer element to the associated body part or body pillar. At least in the event of a crash, the fixing and/or centering element corresponds with a suitable impact contour on the relevant body part/body pillar. At least in the event of a crash, the fixing and/or centering element is positively received in the impact contour or, due to the acting forces, a receiver is first formed by, for example, the deformation of a contact surface of the respective body part.

In other words, the load transfer element can have a fixing element which projects in the vehicle longitudinal direction, which corresponds with the pillar-side receptacle in the impact contour. In the event of a frontal crash, the fixing element is retractable into the receptacle to prevent lateral slipping of the vehicle door or of the side rail (door rail) towards the exterior of the vehicle. Preferably, the fixing element is arranged off-center on the base body in relation to the vehicle longitudinal direction. Particularly preferred, the fixing element is offset towards the interior of the vehicle with respect to the longitudinal axis of the load transfer element. This effectively prevents the hollow profile from buckling inwards. Compared to the hollow profile, the load transfer element is a separate component and is produced independently of the hollow profile and only subsequently joined.

A particularly simple and reliable embodiment of the invention is obtained by the respective load transfer element having a base body, wherein for one, the base body has a free end face on the pillar side or body part side, by means of which in the case of the crash event, the base body of the load transfer element is supported on the associated vehicle pillar. The end face runs preferably perpendicular to the longitudinal axis of the load transfer element and preferably has a surface which is free of a plastic extrusion coating.

The load transfer element can form an impact surface surrounding the mounting section on the hollow profile side, by means of which the base body rests on an end face of the hollow profile, and in the case of the crash event, is supported by the same. Preferably, both the end faces of the hollow profile and the impact surface of the base body extend orthogonally to the force introduction direction or to the course of the hollow profile. In other words, the impact surface of the base bodies is directed radially outwards from the mounting section. Particularly preferred, the free end face of the base body also extends orthogonally to the force introduction direction or to the course of the hollow profile. This has the advantage that the collision forces can be directly and holistically introduced into the hollow profile or the adjacent body part via the load transfer elements or can be passed axially through all relevant adjacent structures, whereby adverse torque forces or the like, which can lead to a buckling load of the hollow profile, can be prevented or at least effectively mitigated. Further preferred, it is provided that the pin-like mounting section is joined in the hollow profile by means of press fit. By using this measure, adhesion of the joining surfaces becomes unnecessary. Further, this measure advantageously prevents a non-uniform load introduction or torque load in the area of the connection points of the load transfer elements on the hollow profile, namely at the ends thereof. In addition, this measure ensures noiseless behavior of the respective components while the motor vehicle is driven. To simplify the joining process and for purposes of noise reduction, the load transfer element can have an extrusion coating of a plastic, at least in the region of the pin-like mounting section.

The respective load transfer element can be formed by a metal insertion or insertion profile, which can be made of a light metal, in particular aluminum or an aluminum alloy, which, in particular, results in weight savings combined with high deformation resistance. The load transfer element can be formed by a hollow profile closed in cross section, or by a solid profile. The first-named alternative goes hand in hand with further weight savings. As tests have shown, this alternative can particularly preferably be further optimized by the load transfer element being formed as a support structure, at least in the region of the base body, wherein the supports are inclined at an angle to the vehicle longitudinal direction. The supports hereby form two outer, opposite side surfaces, which are connected by an internal structure in the form of an X. As a result, a particularly favorable structure is created, which deforms in a crash without breaking and adapts to the impact contour of the body pillar. The supports extend over the entire width of the base body and by their arrangement, form openings on the surfaces adjacent to the side surfaces. In other words, the base body forms a closed frame structure, whose corners are connected by an X inwardly disposed in the frame. In this case, the gussets formed between the frame and the X are designed as cavities. The fixing element is molded to the end face. Preferably, the wall thickness for the supports is 2 to 4 mm.

Advantageously, such a load transfer element is produced or can be produced according to a generally known and inexpensive extrusion process. In order to address different material-dependent, thermal length and/or volume changes with regard to a variable choice of material for the hollow profile, it is preferably provided that the load transfer element has an extrusion coating of a plastic at least in the region of the pin-like mounting section. The choice of material thickness of the plastic extrusion coating produces the press fit. Furthermore, the plastic extrusion coating compensates for any production-related tolerances in the load transfer element and hollow profile, and protects the hollow profile from damage when inserting the pin-like mounting section of the load transfer element in the hollow profile.

The load transfer element can be made of a plastic or a fiber reinforced plastic, such as a glass fiber reinforced polyamide, such as PA 66, by means of a plug-in or insertion profile. In the event of a crash, in order to address a possible crash-related deformation of the body part associated with the respective load transfer element and to ensure a secure load transfer by means of large-area contact between the load transfer element and the associated body part even with the deformation, the load transfer element has a honeycomb structure at least in the region of the base body, wherein the cavities formed by the honeycomb structure extend in the force introduction direction or in the direction of the course of the hollow profile. Such a load transfer element can be produced extremely simply and inexpensively in accordance with a plastic injection molding process. This measure makes it possible to adapt the end face of the base body facing the body part to the "new" surface structure, i.e., the contact surface of the body part formed by the deformation, in that the base body can deform accordingly on the front side. It should be emphasized that this is not a deformation element in the true sense for absorbing collision forces, but this is primarily a shape adjustment. This is, so to speak, an integrated morphine property. With regard to this, it may be warranted and is therefore included in the invention that the deformation property of the base body, which, for example, is set by appropriate dimensioning of the webs forming the honeycomb structure, is locally limited in particular to the area of the free front side. To effect an even more uniform force introduction into the load transfer element, the honeycomb structure of the base body, which forms an additional impact surface, can be designed closed on the body side. However, with regard to the abovementioned plastic injection molding process, this measure is associated with increased manufacturing costs, i.e., an additional process step for closing the front side of the honeycomb structure would be required. Nevertheless, this measure can minimize the number of honeycombs in the honeycomb structure, which in particular can result in material and weight savings.

As far as the hollow profile or crash profile, this is preferably formed by a tube and, according to a practical embodiment, more preferably is formed of a plastic or a fiber reinforced plastic. However, the invention is not limited to the favored tube cross section, which in particular may be a circular section or a polygon section, but may also be a hollow profile in the form of an open profile with, for example, a U-profile section.

The invention will be explained in more detail below with reference to the embodiments schematically shown in the drawings. However, it is not limited to these, but includes all embodiments defined by the claims. For purposes of the present description, the usual direction of travel of a motor vehicle is labeled with "−x" ("minus x"), the direction contrary to its usual direction of travel with "+x" ("plus x"), starting from the usual direction of travel (−x), the direction in the horizontal, transverse to the x-direction as seen to the right, with "+y", starting from the usual direction (−x), the direction in the horizontal, transverse to the x-direction as to the left, with "−y", the direction in the vertical, transverse to the x-direction viewed upward, with "+z", and the direction in the vertical transverse to the x-direction viewed downward, with "−z". This designation of the spatial directions in Cartesian coordinates corresponds to the coordinate system generally used in the motor vehicle industry. Moreover, terms like "front", "back", "top", "bottom", as well as terms with a similar meaning, including the terms "right" and "left", can be used in the way that they are generally used to indicate direction in a motor vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
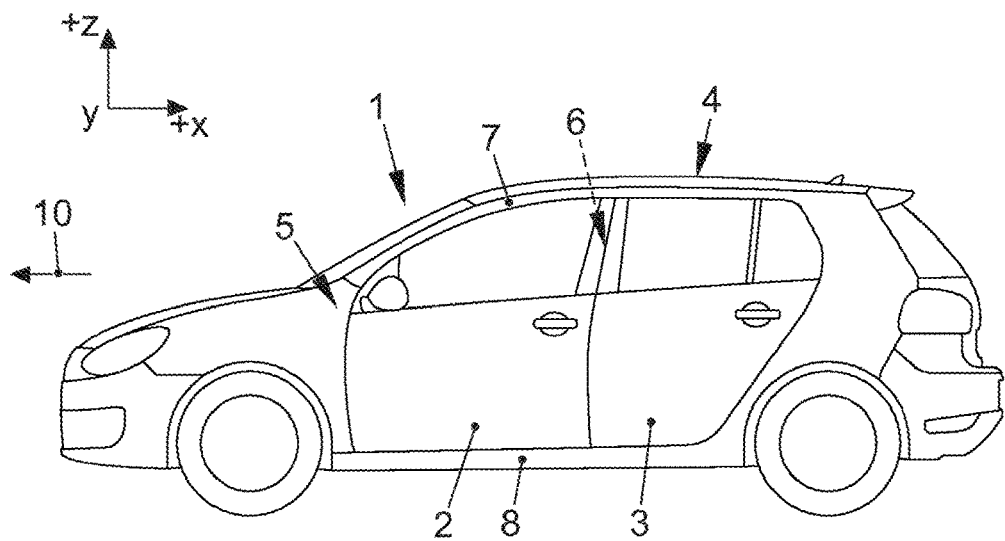
FIG. 1 is a schematic view of a motor vehicle in a side view.

FIG. 1 first shows a motor vehicle 1 in a side view, in the present case, a passenger car only by way of example, with a front and a rear vehicle door 2, 3 on both sides. The invention will be further described below with reference to a front vehicle door 2. The front vehicle door 2 is arranged in a body side structure of a vehicle body 4 and is bounded by an A-pillar 5 towards the vehicle front, and by a B-pillar 6 towards the vehicle rear. The vehicle door 2 is pivotally mounted on the B-pillar 5 about a vertical axis (Z-axis) by means of hinges. As already demonstrated in the introduction, the roof rails 7 and rocker panel 8 of the motor vehicle 1 form a first and a second load path on both sides thereof in order to direct the collision forces to the rear of the vehicle in the event of a frontal crash. A rear vehicle door 3 is correspondingly limited by the vehicle pillars B and C. The B pillar 6 thus replaces the A-pillar 5. The same applies to the C-pillar.

Figure 2:
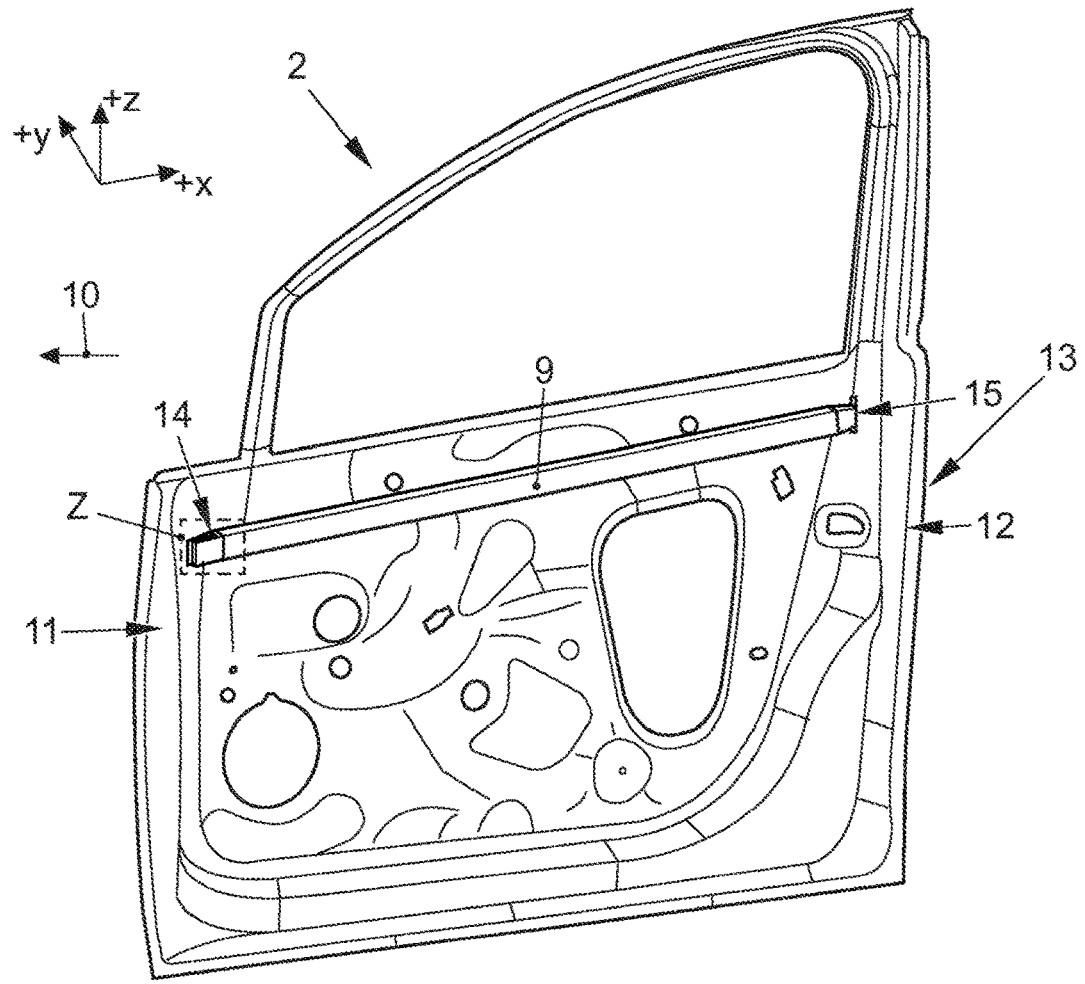
FIG. 2 is a perspective interior view of a shell of a front vehicle door of the motor vehicle according to FIG. 1, with a hollow profile as a crash profile and with load transfer elements essential to the invention.
Figure 8:
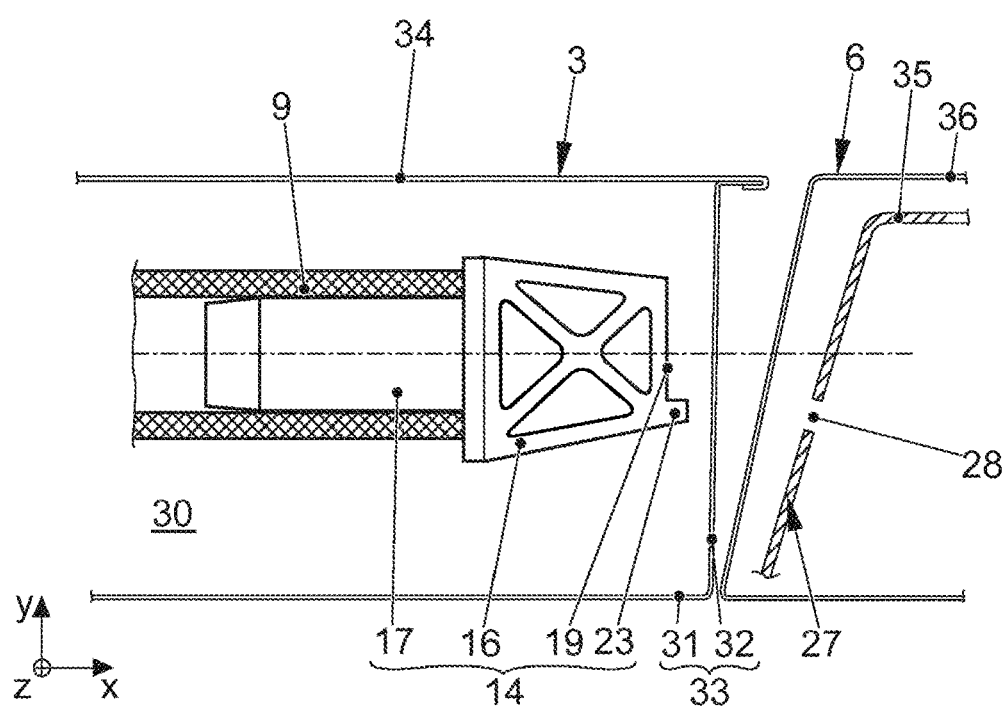
FIG. 8 is a schematic sectional view of a partial sectional view of a body side structure at the level of a hollow profile.

With regard to FIG. 2, in each case also a third load path is created on both sides of the motor vehicle 1 by means of an elongated hollow profile 9 functioning as a crash profile. As can be further seen from FIG. 2 and FIG. 8, a hollow profile 9 is arranged in the door interior 30 of the vehicle door 2 as a door side rail. In other words, the hollow profile 9 extends in the door interior 30 in the closed state of the vehicle door 2, substantially in the main direction of travel 10 of the motor vehicle 1 or in the vehicle longitudinal direction (X direction), between the door front sides 32 of the support structure 13 of the vehicle door 2. In FIG. 8, the door interior 30 is limited by a cup-shaped door inner sheet metal part 31 which, together with a rear door front side 32, defines a door inner side 33. The door inner sheet metal part 31 is covered by a vehicle-exterior, door outer sheet metal part 34. The hollow profile 9 extends in approximately a horizontal orientation and is attached to connection points inside the vehicle door 2. In the further course along the vehicle longitudinal direction x to the rear, the B-pillar 6 joins the vehicle door 2 with a gap distance, with a pillar reinforcing element 35 positioned therein (only coarsely indicated), which is enclosed by a sheet metal profile 36. In the event of the frontal crash, one end of the hollow profile 9 is axially supported on the door front side 32, and the sheet metal profile 36 on the B-pillar 6, and the other end is supported on the A-pillar 5, thus allowing the transfer of collision forces from the vehicle front to the vehicle rear via this formed, third load path.

The hollow profile 9 is formed by a tube with a polygonal or rectangular pipe cross section (see in particular FIG. 4), and according to a practical embodiment, is formed of a plastic or a fiber reinforced, for example, glass or carbon fiber reinforced plastic in which the fibers or a semi-finished fiber are embedded in a plastic matrix. However, the invention is not limited to the tube cross section shown here, but also includes different polygonal or circular or rounded cross sections. In addition, the invention also includes a hollow profile with an open profile cross section, for example a U-profile cross section. As can further be seen from FIG. 2, the hollow section 9 has a load transfer element 14, 15 at each end face and is supported accordingly on the respective vehicle pillar 5, 6 during the frontal crash event, with the interposition of the load transfer elements 14, 15.

Figure 3A:
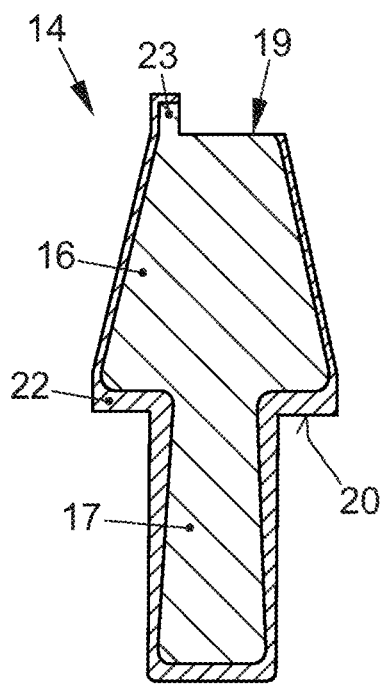
FIGS. 3a to 3f are sectional views of load transfer elements in various embodiments thereof.
Figure 3B:
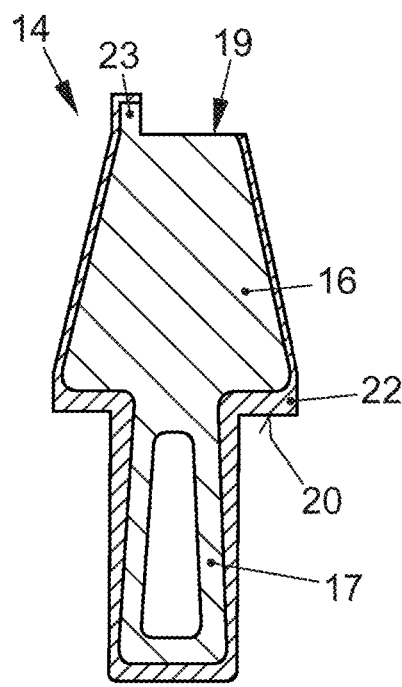
Figure 3C:
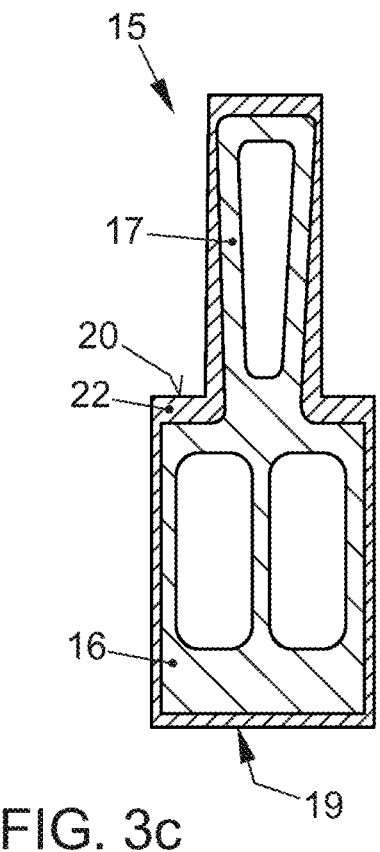
Figure 3D:
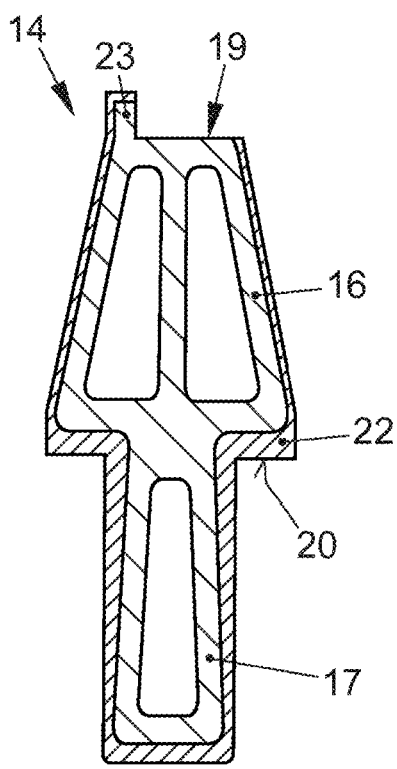
Figure 3E:
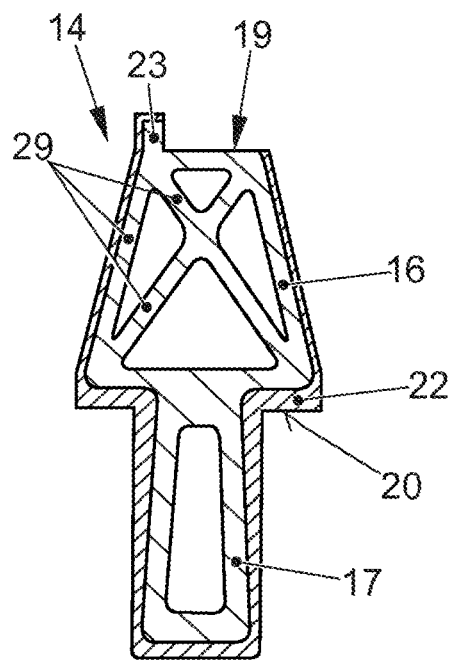
Figure 3F:
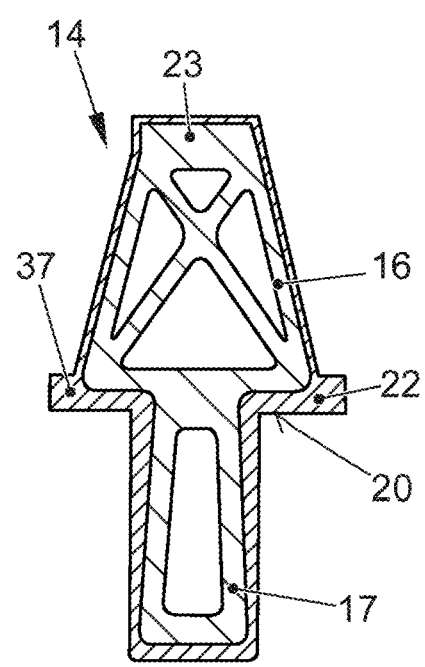
Figure 4:
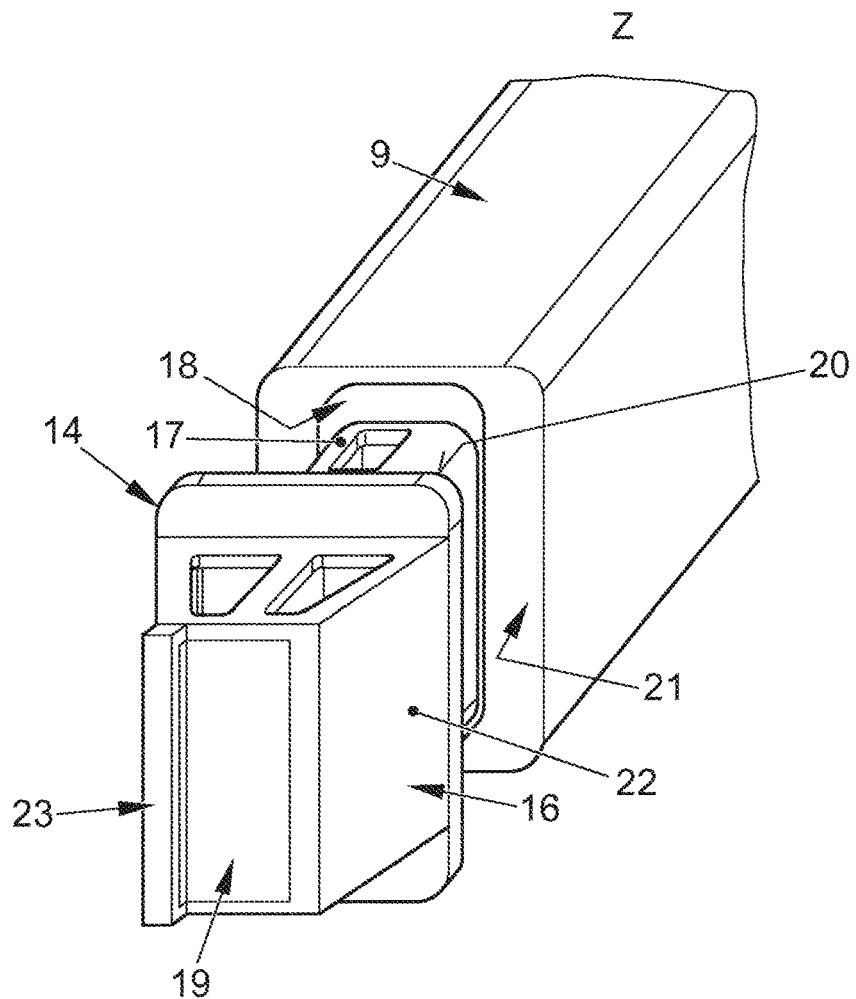
FIG. 4 is a perspective view of the load transfer element according to FIG. 3d, immediately before joining with the hollow profile (detail "Z" according to FIG. 2)
Figure 5A:
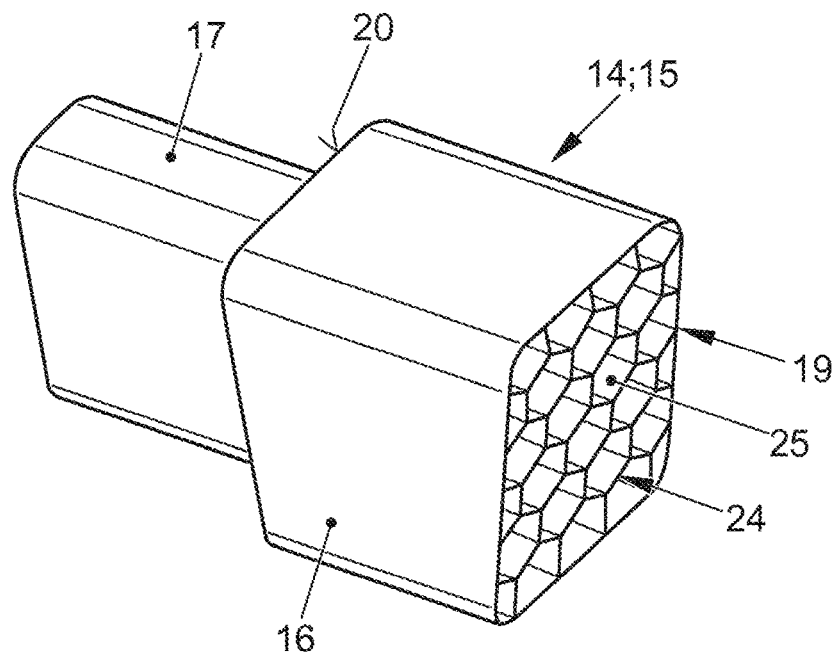
FIG. 5a is a perspective front view of a load transfer element according to the invention.
Figure 5B:
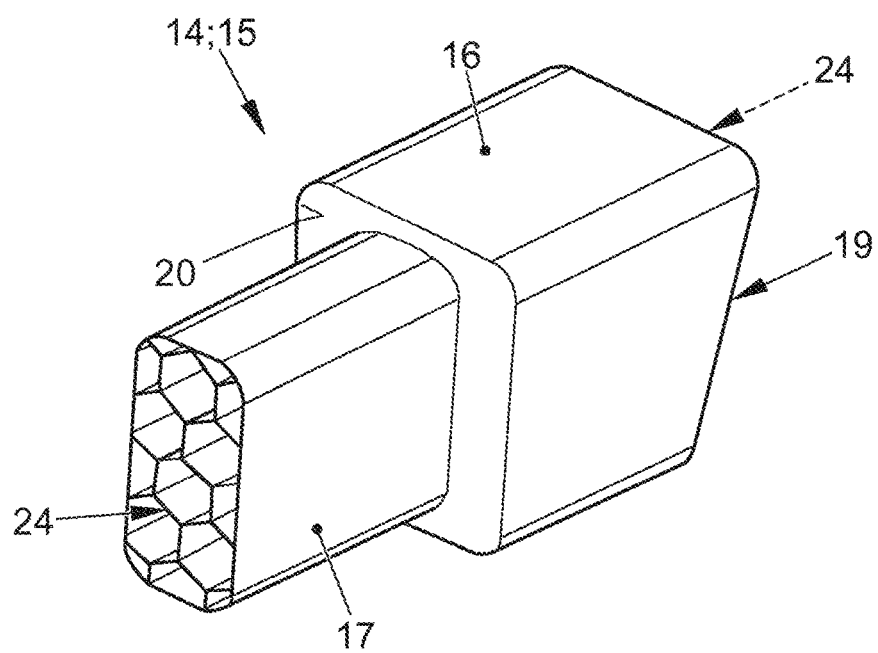
FIG. 5b is the load transfer element according to FIG. 5a, in a perspective rear view.
Figure 6A:
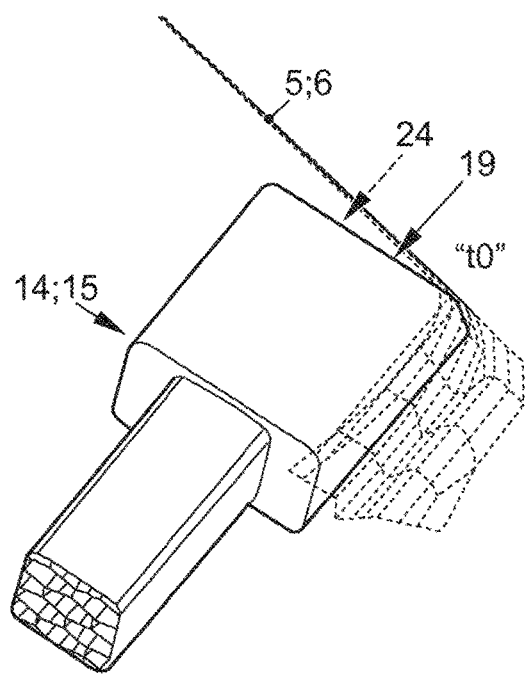
FIGS. 6a to 6d illustrate the load transfer element of FIGS. 5a and 5b during use at advanced times "$t_0$" to "$t_3$"
Figure 6B:
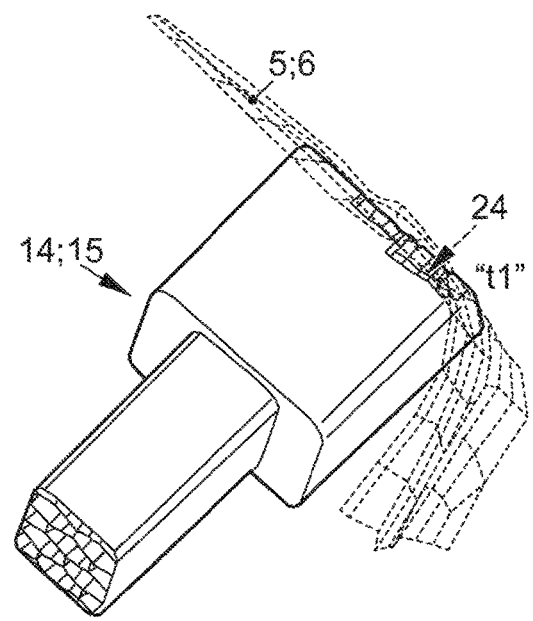
Figure 6C:
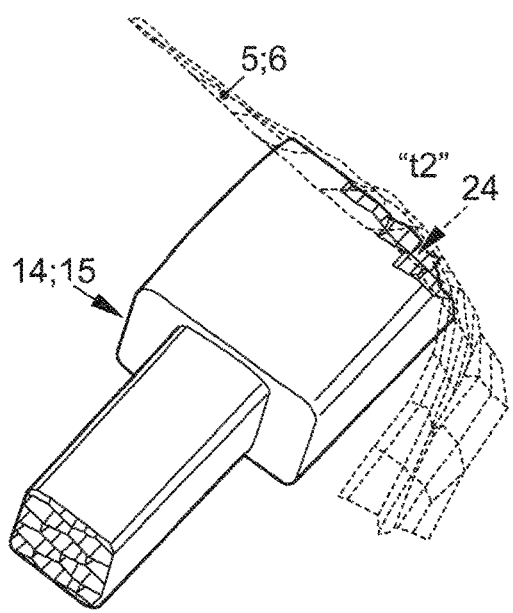
Figure 6D:
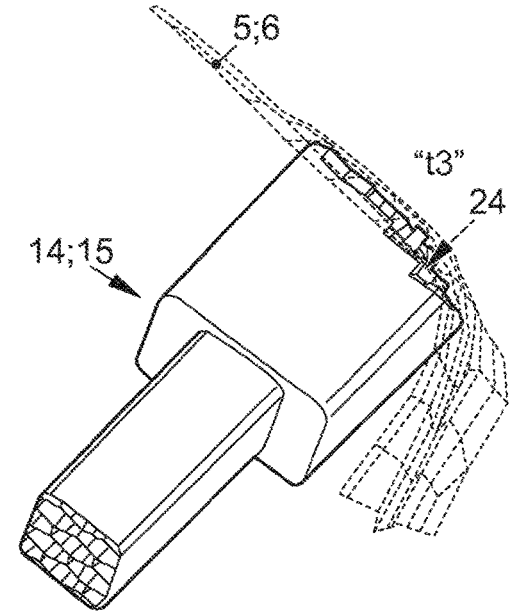

FIGS. 3a to 4 show an first embodiment variant of the load transfer elements 14, 15 in various embodiments thereof. According to this embodiment, as viewed in the vehicle longitudinal direction (X-direction), the load transfer element 14 is a load transfer element 14 which can be used for the front and rear, and the load transfer element 15 is a load transfer element 15 which is particularly designed for the B-pillar.

The respective load transfer element 14, 15 integrally has a base body 16 as well as a pin-like mounting section 17 adjoining the former on the hollow profile side. With respect to FIG. 4, the mounting section 17 is received by the hollow profile 9 in combination with the same in that during assembly of the load transfer element 14, 15, the load transfer element 14, 15 is joined, preferably with a press fit, or plugged with its mounting section 17 on the front side of the hollow profile 9 into the axial opening 18 thereof for receiving the mounting section 17. If, on the other hand, an open profile (hollow profile 9) is provided, the load transfer element 14, 15 can be inserted also from the side by its mounting section 17, preferably with a press fit into the former. More preferably, the mounting section 17 has a cross section which is form complementary to the cross section of the opening 18, according to this embodiment, a rectangular cross section.

The base body 16 of each load transfer element 14, 15 has a free front side 19 on the body part side, by means of which in the case of the crash event, the base body 16 is directly supported on the body pillar 5, 6, which is assigned to the respective load transfer element 14, 15 via an associated side portion 11, 12 of the support structure 13 of the vehicle door 2, or is indirectly supported. On the hollow profile side, the base body 16 forms an impact surface 20 surrounding the mounting section 17, by means of which the base body 16 abuts against an end face 21 of the hollow profile 9, and in the case of the crash event, is supported on the same. According to this embodiment, both the end faces 21 of the hollow profile 9 and the free front side 19 and the impact surface 20 of the base body 16 extend orthogonally to the direction of force introduction, which ideally corresponds to the course of the hollow profile 9, in the present case, in the vehicle longitudinal direction (X-direction).

According to this first embodiment variant of the load transfer elements 14, 15, these are preferably each formed by a metal insertion profile, which, further preferred, is made of a light metal, in particular aluminum or an aluminum alloy, resulting in particular in weight savings combined with a high resistance to deformation. The load transfer element 14, 15 may be formed by a hollow profile closed in cross section with at least one perforation (see in particular FIGS. 3b-4) or by a solid profile (see in particular FIG. 3a). The former alternative is associated with increased weight savings. Advantageously, such a load transfer element 14, 15 is manufactured or can be manufactured according to a known and inexpensive extrusion process.

To satisfy different material-dependent, thermal length and/or volume changes with regard to a variable choice of material for the hollow profile, it is preferably provided that the load transfer element 14, 15 has an extrusion coating 22 made of a plastic, preferably a thermoplastic material, at least in the area of the pin-like mounting section 17, in this case in the area of the entire load transfer element 14, 15. The choice of material thickness of the plastic extrusion coating 22 produces the press fit. Furthermore, the plastic extrusion coating 22 also compensates for any production-related tolerances in the load transfer element 14, 15 and hollow profile 9 and protects the hollow profile 9 from damage when inserting the pin-like mounting section 17 of the load transfer element 14, 15 in the hollow profile.

As can be seen further in FIGS. 3a, 3b, 3d, 3e, 3f and 4, which according to this embodiment show the front load transfer element 14, a web-like fixing and/or centering element 23 is designed at or in the area of the free front side 19 of the base body 16 to ensure secure fixing and/or centering of the relevant load transfer element 14 on the associated body pillar 5 in the event of a crash. This fixing and/or centering element 23 corresponds, at least in the event of a crash, with a receptacle 28 shown in FIG. 8 as a bolt opening on the respective body pillar 5, and is positively received by the same. The receptacle 28 may be formed, for example, by an indentation or recess in the pillar reinforcing element 35 of the body pillar 5, 6, which is complementary to the shape of the fixing and/or centering element 23. Furthermore, it may also be provided and is accordingly also covered by the invention, that as a result of the acting forces, such a bolt opening is only formed in the door front side 32 and the sheet metal profile 36 by, for example, punching out a contact surface of the respective body pillar 5, 6 or vehicle door 2, 3, which for example can be achieved by a material weakness in the relevant area of the door front side 32 and the sheet metal profile 36. However, the bolt opening in the door front side 32 and the sheet metal profile 36 does not provide a receptacle 28 in the true sense, since the sheet thickness and the sheet strength of the door front side 32 and the sheet metal profile 36 are too low.

FIGS. 3a, 3b, 3d and 3e successively show improved weight optimization of the load transfer element 14. FIGS. 3e and 3f show the same component in different sections. According to FIG. 8, FIG. 3e shows the load transfer element 14 after installation in the motor vehicle 1 in a section in a horizontal plane or in the x-y plane. FIG. 3f shows the load transfer element 14 after installation in the motor vehicle 1 according to FIG. 8 in a section in a vertical plane or in the x-z plane. As can be seen in FIG. 3f, the load transfer element 14 has an outwardly directed collar 37 on the impact surface 20. The collar 37 is completely made of plastic and is part of the extrusion coating 22. The collar 37 protrudes perpendicular to the longitudinal axis of the load transfer element 14, which in the installed position of the load transfer element 14 is identical to the longitudinal axis of the hollow profile 9, beyond the base body 16 in the manner of a rib. The collar 37 serves as a supplementary fixation of the hollow profile 9 in the event of crash loading. As shown in general in FIG. 4, the embodiments according to FIGS. 3a, 3b, 3c and 3d also have a collar 37. However, for the sake of simplicity, no corresponding section in the x-z plane is shown in which the collar 37 would be evident.

The fixing element 23, as can be seen from FIG. 8, is arranged off-center to the longitudinal axis of the base body 16 and the hollow profile 9. In this case, the fixing element 23 is offset towards the center of the vehicle with respect to the longitudinal axis. Furthermore, it can be seen from FIG. 8 that the hollow profile 9 is disposed in a door interior 30. In FIG. 8, the extrusion coating 22 of the load transfer element 15 has been omitted for the sake of simplicity.

As is further apparent from FIG. 8, the pillar-side impact contour 27 has a receptacle 28 in which the fixing element 23 of the load transfer element 14, 15 is retractable in the event of a frontal crash to prevent lateral sliding of the vehicle door 2 toward the outside of the vehicle. Specifically, the receptacle 28 is formed as a bolt opening in the pillar reinforcing element 35, in which in a crash, the fixing member 23 engages in the manner of a bolt. According to FIG. 8, the pillar-side impact contour 27 is an inclined side edge of the U-profile-shaped pillar reinforcing element 35, as seen in the cross sectional profile.

Below, the operation of the load transfer element 14, 15 will be described with reference to FIG. 8 in interaction with the receptacle (bolt opening) 28 in the pillar reinforcing element 35, namely in a frontal crash with little lateral overlap. In this case, the vehicle collision occurs with little overlap in the vehicle transverse direction y, laterally outside of the corresponding body side rail, whereby the rim of the vehicle front wheel (FIG. 1) is pressed against the A-pillar 5. As the crash progresses, the load transfer element 14, 15 of the vehicle door 2 and the impact contour 27 of the B-pillar 6 facing the element enter into a load transferring connection, resulting in a lateral load path along which the collision forces are transferred via the hollow profile 9 to the B-pillar 6.

As is apparent from FIG. 8, during the crash, the fixing element 23 breaks through both the rear door front side 32 and the outer sheet metal profile 36 of the B-pillar 6 and retracts the fixing element 23 in the receptacle 28 in the pillar reinforcing element 35. With the interposition of the door inner sheet metal part 31 and the outer sheet metal profile 36, the load transfer element 14, 15 and the pillar reinforcing element 35 are thereby brought into the above-mentioned load transferring connection, through which the collision forces can be introduced in the B-pillar 6.

FIG. 3c shows a specific embodiment for a rear vehicle door 3. The embodiment differs from the other examples in FIG. 3 by the non-conical characteristic of the base body 16 and the resulting broad front side 19. This results in a large-scale coupling to the pillar reinforcing element 35. This feature is also seen in the second embodiment variant shown in FIGS. 5a to 7.

FIGS. 5a to 7 show a second embodiment variant of the load transfer elements 14, 15. This second embodiment variant initially differs from the first embodiment variant in that this is formed as a plug-in or insertion profile from a plastic or a fiber reinforced plastic, such as a glass or plastic carbon fiber reinforced polyamide, such as PA66. In the event of a crash, in order to address a possible crash-induced deformation of the body pillar 5, 6 assigned to the respective load transfer element 14, 15, and also to ensure a secure load transfer in the case of the deformation by means of a large-area contact between the load transfer element 14, 15 and the associated body pillar 5, 6, the load transfer element 14, 15 has a honeycomb structure 24 at least in the region of the base body 16, in this case in the entire region of the load transfer element 14, 15. The cavities formed by the honeycomb structure 24 extend in the force introduction direction or in the direction of the course of the hollow profile 9.

This measure allows for an adaptation of the front side 19 of the base body 16 facing the body pillar 5, 6 to the "new" surface structure or contact surface of the body pillar 5, 6 formed by deformation in that the base body 16 of the load transfer element 14, 15 can correspondingly deform frontally. In this respect, FIGS. 6a to 6d very schematically show the frontal deformation of the base body 16 and the adaptation thereof to the changing contact surface of the body pillar 5, 6 due to the deformation in the period "$t_0$" to "$t_3$".

Figure 7:
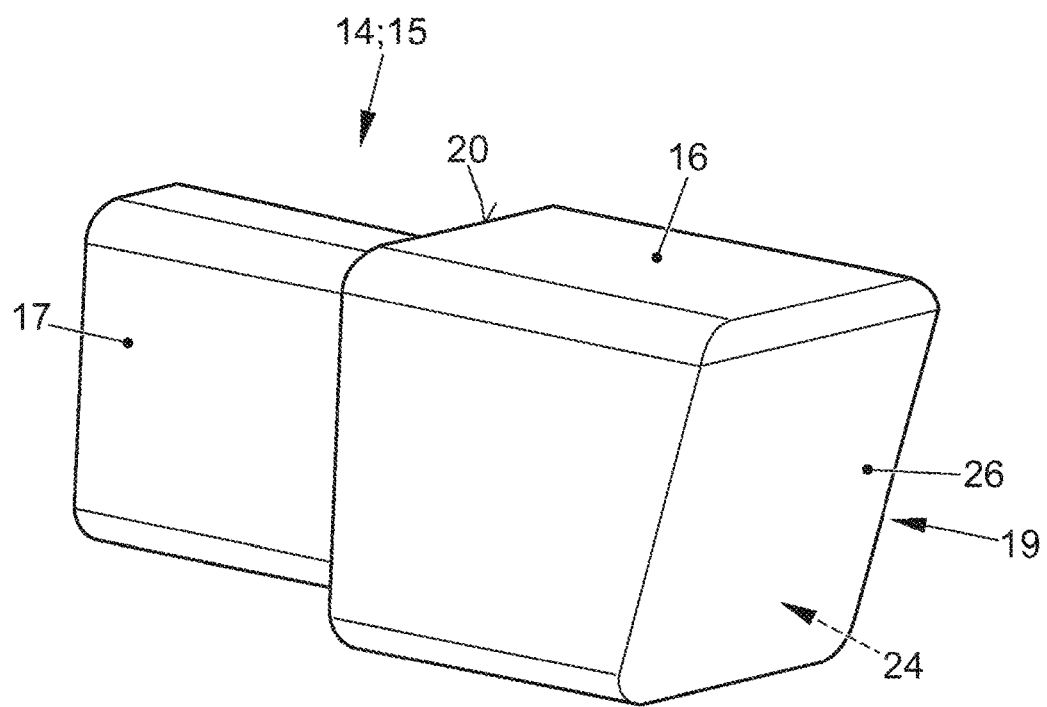
FIG. 7 illustrates the load transfer element according to FIGS. 5a and 5b when the same is in use (deformed)

It is noted that this is not a deformation element in the actual sense for absorbing collision forces, but primarily a shape adaptation by means of integrated morphine traits. In this regard, it may be appropriate and is thus included in the invention that the base body 16 only locally has the deformation property, in particular in the area of the free front side 19, which, for example, is set by appropriate dimensioning of the webs 25 forming the honeycomb structure 24 (see FIG. 5a). To effect an even more uniform introduction of force into the load transfer element 14, 15, the honeycomb structure 24 of the base body 16, forming an additional impact surface 26, can be designed closed on the body part side. FIG. 7 shows a currently operating load transfer element 14, 15 which is designed in such a way, i.e., its shape has already been adapted to the collision-induced deformation of the surface structure or contact surface of the body pillar 5, 6.

As far as the joining process of such a load transfer element 14, 15 is concerned, this is based on the one described for the first embodiment variant. In principle, also here, preferably a press fit is used. This can be achieved directly through the processing or designing of the mounting section 17, or also by means of a plastic extrusion coating 22. As regards the fixing and/or centering element 23 preferred in the first embodiment variant, this may seem dispensable, but may still be provided due to certain circumstances and is therefore also covered in this case by the invention.

The embodiments described above focus on a hollow profile 9 equipped with load transfer elements 14, 15 as a crash profile, which, in forming the third load path, extends in the vehicle longitudinal direction (X direction) and is disposed within the shell of a front vehicle door 2. The invention, however, is not limited to this specifically described embodiment, but also includes a corresponding hollow profile 9, which is arranged within a rear vehicle door 3. In addition, the invention covers respectively designed hollow profiles 9, which as crash profiles are not oriented in the vehicle longitudinal direction (X direction), but in any other direction, in particular, with regard to a side crash event, also in the vehicle transverse direction (Y direction), and which are preferably mounted outside a vehicle door 2, 3 at a suitable location in the vehicle body 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A body side structure for a motor vehicle, the body side structure comprising:
   a vehicle door arranged between vehicle pillars in a vehicle longitudinal direction; and
   a hollow profile extending in the vehicle longitudinal direction, the hollow profile being arranged in a door interior of the vehicle door, the hollow profile, in an event of a frontal crash, forms a load path in the vehicle longitudinal direction together with the vehicle pillar facing the crash and the vehicle pillar facing away from the crash, with which collision forces are adapted to be transferred toward a rear of the vehicle,
   wherein the hollow profile has a load transfer element on a side facing away from the crash and/or a side facing the crash, which in the event of a frontal crash, the load transfer element is pressed into a load transferring connection with an impact contour of the vehicle pillar facing away from the crash and/or the vehicle pillar facing the crash,
   wherein the load transfer element has a base body and a pin-like mounting section that protrudes from a portion of a first surface of the base body, the first surface facing the hollow profile,
   wherein the pin-like mounting section is inserted in an end of the hollow profile,
   wherein the base body has a second surface that opposes the first surface, via which, in the event of a frontal crash, the base body of the load transfer element is supported on the associated vehicle pillar, wherein the second surface of the base body has at least one fixing and/or centering element, the at least one fixing and/or centering element protruding from a portion of the second surface in the vehicle longitudinal direction, and wherein the at least one fixing and/or centering element is arranged off-center with respect to a centerline of the base body.

2. The body side structure according to claim 1, wherein the impact contour has a corresponding receptacle, and wherein, in the event of a frontal crash, the at least one fixing and/or centering element is inserted into the receptacle in order to prevent a lateral sliding of the vehicle door or a side rail towards an outside of the vehicle.

3. The body side structure according to claim 1, wherein the first surface of the base body forms an impact surface, wherein the impact surface of the base body rests against an end face of the hollow profile and in the event of a frontal crash, the impact surface is supported on the end face.

4. The body side structure according to claim 3, wherein the end face of the hollow profile, the impact surface of the base body and the second surface of the base body each extend orthogonally to the force introduction direction or to the course of the hollow profile.

5. The body side structure according to claim 1, wherein at least in the region of the pin-like mounting section, the load transfer element has an extrusion coating made of a plastic.

6. The body side structure according to claim 1, wherein the hollow profile is a fiber reinforced plastic component, and/or the load transfer element is a metal component, which is made of aluminum or an aluminum alloy.

7. The body side structure according to claim 1, wherein the base body, the pin-like mounting section, and the at least one fixing and/or centering element of the load transfer element are integrally formed as a section of an extruded profile.

8. The body side structure according to claim 1, wherein at least in a region of the base body, the load transfer element has a honeycomb structure, wherein cavities formed by the honeycomb structure extend in a direction of force or in a direction of the course of the hollow profile.

9. The body side structure according to claim 1, wherein at least in a region of the base body, the load transfer element has support structures, wherein the support structures are inclined at an angle to the vehicle longitudinal direction.

10. The body side structure according to claim 9, wherein the support structures extend over an entire width of the base body.

11. The body side structure according to claim 1, wherein the at least one fixing and/or centering element and the pin-like mounting section are arranged on opposite sides of the base body in relation to the vehicle longitudinal direction and are formed of a same material as the base body.

12. The body side structure according to claim 1, wherein the at least one fixing and/or centering element is arranged entirely off to one side of the centerline of the base body.

13. The body side structure according to claim 9, wherein the support structures are webs provided inside of the base body.

* * * * *

UNITED STATES PATENT AND TRADEMARK OFFICE
CERTIFICATE OF CORRECTION

Page 1 of 1

PATENT NO. : 10,960,738 B2
APPLICATION NO. : 16/121005
DATED : March 30, 2021
INVENTOR(S) : Herten et al.

It is certified that error appears in the above-identified patent and that said Letters Patent is hereby corrected as shown below:

On the Title Page

(30) Foreign Application Priority Data
Mar 1, 2016     (DE)..........................................10 2016 203 339.5
Sep 19, 2016     (DE)..........................................10 2016 217 847.4

Should show:
(30) Foreign Application Priority Data
Mar 1, 2016     (DE)..........................................10 2016 203 339.5
Aug 12, 2016     (DE)..........................................10 2016 215 114.2
Sep 19, 2016     (DE)..........................................10 2016 217 847.4

Signed and Sealed this
Eleventh Day of May, 2021

Drew Hirshfeld
*Performing the Functions and Duties of the
Under Secretary of Commerce for Intellectual Property and
Director of the United States Patent and Trademark Office*